United States Patent [19]

Gabriel et al.

[11] Patent Number: 4,975,704
[45] Date of Patent: Dec. 4, 1990

[54] METHOD FOR DETECTING SURFACE MOTIONS AND MAPPING SMALL TERRESTRIAL OR PLANETARY SURFACE DEFORMATIONS WITH SYNTHETIC APERTURE RADAR

[75] Inventors: Andrew K. Gabriel, Altadena; Richard M. Goldstein, La Canada; Howard A. Zebker, Altadena, all of Calif.

[73] Assignee: The United States of America as represented by the Administrator of the National Aeronautics and Space Administration, Washington, D.C.

[21] Appl. No.: 470,665

[22] Filed: Jan. 26, 1990

[51] Int. Cl.$^5$ .............................................. G01S 13/90
[52] U.S. Cl. ...................................................... 342/25
[58] Field of Search ......................................... 342/25

[56] References Cited

U.S. PATENT DOCUMENTS

| | | |
|---|---|---|
| 2,616,077 | 10/1952 | Holser ..................................... 343/5 |
| 3,191,170 | 6/1965 | Lustig et al. ............................ 343/5 |
| 4,551,724 | 11/1985 | Goldstein et al. ...................... 345/5 |

OTHER PUBLICATIONS

A. K. Gabriel and R. M. Goldstein, "Crossed Orbit Interferometry: Theory and Experimental Results from SIR-B," Int. J. Remote Sensing, vol. 9, No. 5, pp. 857–872, 1988.
H. A. Zebker and R. M. Goldstein, "Topographic Mapping from Interferometric Synthetic Aperture Radar Observations," Jrnl. of Geophysical Research, vol. 91, No. B5, pp. 4993–4999, Apr. 10, 1986.
R. M. Goldstein and H. A. Zebker, "Interferometric Radar Measurement of Ocean Surface Currents," Nature, vol. 328, No. 6132, pp. 707–709, Aug. 20, 1987.
R. M. Goldstein, H. A. Zebker & C. L. Werner, "Satellite Radar Interferometry: Two-dimensional Phase Unwrapping," Radio Science, vol. 23, No. 4, pp. 713–720, Jul.–Aug. 1988.

Primary Examiner—Thomas H. Tarcza
Assistant Examiner—Mark Hellner
Attorney, Agent, or Firm—Thomas H. Jones; John R. Manning

[57] ABSTRACT

A technique based on synthetic aperture radar (SAR) interferometry is used to measure very small (1 cm or less) surface deformations with good resolution (10 m) over large areas (50 km). It can be used for accurate measurements of many geophysical phenomena, including swelling and buckling in fault zones, residual, vertical and lateral displacements from seismic events and prevolcanic swelling. Two SAR images are made of a scene by two spaced antennas and a difference interferogram of the scene is made. After unwrapping phases of pixels of the difference interferogram, surface motion or deformation changes of the surface are observed. A second interferogram of the same scene is made from a different pair of images, at least one of which is made after some elapsed time. The second interferogram is then compared with the first interferogram to detect changes in line of sight position of pixels. By resolving line of sight observations into their vector components in other sets of interferograms along at least one other direction, lateral motions may be recovered in their entirety. Since in general, the SAR images are made from flight tracks that are separated, it is not possible to distinguish surface changes from the parallax caused by topography. However, a third image may be used to remove the topography and leave only the surface changes.

13 Claims, 3 Drawing Sheets

METHOD FOR DETECTING SURFACE MOTIONS AND MAPPING SMALL TERRESTRIAL OR PLANETARY SURFACE DEFORMATIONS WITH SYNTHETIC APERTURE RADAR

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to a method of detecting surface motions and measuring and mapping changes in terrestrial or planetary surface deformations with high resolution (1 cm) and high spatial resolution (typically 10 m) over large areas (typically swaths 50 km wide) using synthetic aperture radar (SAR) images. The method is based on SAR interferometry and uses interferograms produced from multiple images of the same area spaced apart in time. Changes in line of sight location are calculated from the measurement of the phase differences between corresponding pixels of the interferograms.

BACKGROUND ART

In an airborne or spaceborne SAR, microwaves illuminate the terrain below the platform, and the echoes scattered from the surface are collected. Subsequent signal processing performed on the echoes produces an image of the scene, where each picture element (pixel) contains amplitude and phase information. A display of the amplitude information produces the familiar SAR images, which look very similar to photographs with high spatial resolution, typically ~10 m in a swath 50 km wide.

It has been demonstrated that interferometric SAR observations provide a means for obtaining high resolution topographic terrain maps from data acquired simultaneously at two slightly displaced antennas. R. M. Goldstein, E. R. Caro and C. Wu, U.S. Pat. No. 4,551,724 issued Nov. 5, 1987; H. A. Zebker and R. M. Goldstein, "Topographic Mapping from Interferometric Synthetic Aperture Radar Observations," Journal of Geophysical Research, Vol. 91, No. B5, pp. 4993–4999, (1986). Typically, topographic maps are produced from a stereo pair of optical photographs in which the appearance of the same terrain at slightly different positions is used to deduce the height of the terrain. That is distinct from the interferometric approach used in the present invention. The following is excerpted from the paper cited above.

In producing an interferometric SAR observation, two transversely spaced antennas $A_1$ and $A_2$ are mounted on an aircraft equipped with side-looking radar as shown in FIG. 1a. Reflected energy from the ground is received simultaneously by the two antennas and separately recorded and processed to yield two ~10-m resolution complex images (magnitude and phase). The phase $\phi$ of the return signal from each resolution element (pixel) is maintained together with its magnitude. The two images are then combined pixel by pixel to obtain a single image with the phase of each pixel being the difference of the two original phases and the magnitude of each pixel the product of the two original magnitudes.

The radar system yields the line-of-sight distance (slant range) $\rho$ and $\rho'$ from each antenna to the target point P. The vertical distance h from the antenna to the surface is obtained from the solution of simple geometric relationships using either slant range. However, the slant range is indeterminate within the slant range resolution (typically ±3.75 m) of the radar which depends principally on the transmitted signal bandwidth. The interferometric technique permits determination of the slant range $\rho$-$\rho'$ to much greater precision (typically 1 cm) as shown in FIG. 1b.

The two measurements of $\rho$ and $\rho'$, with the geometrical factors B and $\theta$ shown in FIG. 1b, are sufficient to find aircraft height h above each point in the radar image and from that deduce elevation of each point. The height h, when combined with the conventional along-track and slant-range ($\rho$-$\rho'$) measurements, yields the three-dimensional position of a given point in the image. Knowledge of the location of each point then permits rectification of the image to a cartographically accurate form. In that manner, two SAR images recorded simultaneously with two receiving antennas separated slightly in the cross-track direction, or recorded with one antenna on two parallel but spaced apart passes, will provide topographic data of the terrain.

As just noted, it is possible to perform the necessary measurements for SAR interferometry with only one antenna mounted on one orbiting spacecraft, or on one or two aircraft, by making two passes over the terrain along separate but parallel paths. If the two passes are not parallel and instead are skewed, the difficulty of determining elevation of corresponding pixels in the separate images is substantially increased. A. K. Gabriel and R. M. Goldstein, "Crossed orbit interferometry: theory and experimental results from SIR-B," Int. J. Remote Sensing, Vol. 9, No. 5, pp. 857–872 (1988). In any case, it is recognized that in determining the elevation of any given point in the scene, the phase of the radar echoes may only be measured modulo $2\pi$, whereas the whole phase $N2\pi$ is needed to determine absolute elevation. An approach to "unwrapping" the $2\pi$ ambiguities in the data set has been presented in detail. R. M. Goldstein, H. A. Zebker and C. L. Werner, "Satellite radar interferometry: Two-dimensional phase unwrapping," Radio Science, Vol. 23, No. 4, pp. 713–720 (1988). The algorithm for deriving a satisfactory set of phases for SAR interferometry detailed there is incorporated here by reference.

STATEMENT OF THE INVENTION

A general object of this invention is to use multiple (2 or more) SAR images for detecting surface motions, and mapping very small (~1 cm) surface deformations (changes in elevation) over very large areas. The extreme sensitivity of this technique to surface motion or deformation in terms of high spatial resolution (typically 10 m) and broad swath coverage (typically 50 km wide) means it could be used to make extensive, accurate measurements of geophysical phenomena, including heaving and buckling in fault zones, tectonic plate motions, residual displacements from seismic events and motion from prevolcanic swelling.

For detecting surface, two SAR images are mode of an area spaced in time, but with flight paths duplicated, such as by accurately duplicating the flight path later in time or mounting a second SAR antenna in an aircraft well aft of the first antenna. After processing, a difference interferogram of the area is made from two resulting SAR images. Then, after unwrapping phases of pixels of the difference interferogram (to restore $2\pi$ multiples of phase that disappear in the making of the difference interferogram), the surface motion or deformation changes are observed.

In the more general case, two interferograms are made from different pairs of three (or more) SAR images of the same area (sometimes referred to hereinafter as the same "scene"), where the second pair involves at least one image taken at a different time from images of the first pair. If the ground tracks for the SAR images are not parallel, an algorithm is used to compensate for this in the azimuth processing of data for the images, but before the interferograms are made, it is necessary to register the images. This is typically accomplished by resampling one image until it overlays the other accurately. Then an interferogram is made by calculating the phases corresponding to each pixel and computing their differences. To resolve phase ambiguity for precise elevation information, phase "unwrapping" is required.

The unwrapped phases of the two interferograms are again differenced to produce a third interferogram referred to hereinafter as a "double-difference interferogram." This second differencing step removes phase changes from pixel to pixel due to topography, leaving a new phase image with nonzero phases only in areas where the terrain surface has moved in the time between the observations for the first pair of images and the second pair of images used to produce the first and second interferograms. The phase differences of the double difference interferogram can be used to deduce the amount of surface deformation that has occurred.

DETAILED DESCRIPTION OF THE INVENTION

Figure 1A:
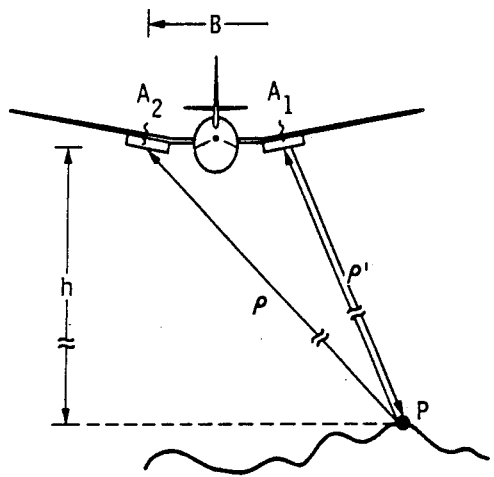
FIG. 1a illustrates schematically the observational geometry of a SAR interferometer.
Figure 1B:
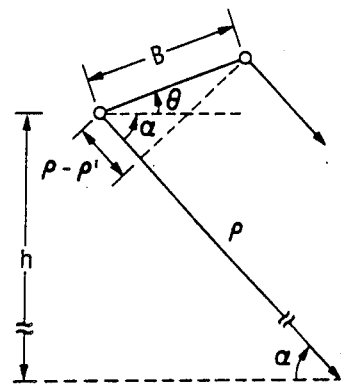
FIG. 1b illustrates the geometry when the baseline between antennas is not horizontal.
Figure 2A:
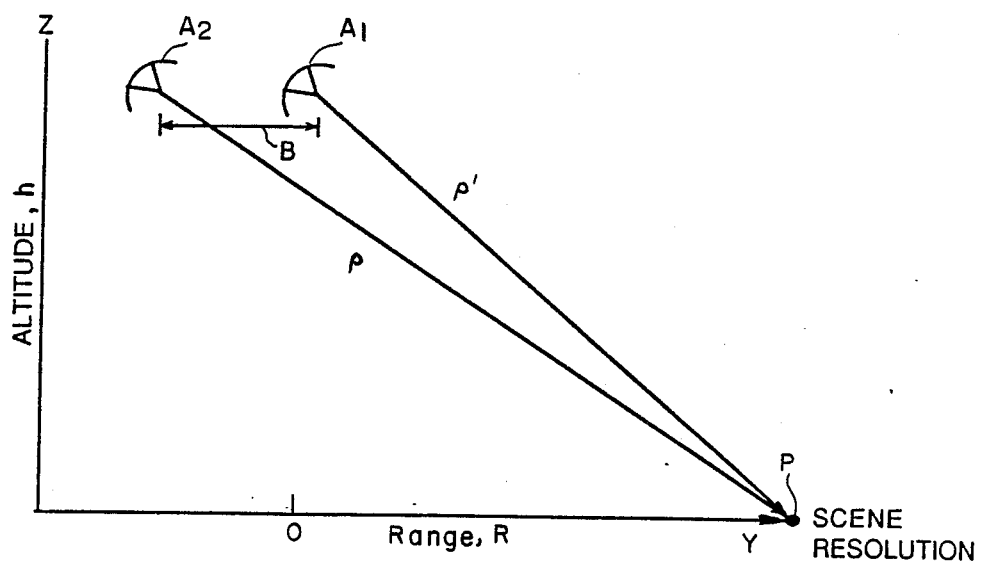
FIG. 2a illustrates the geometry of two SAR observations of a scene made from different locations in space using the same antenna for repeat observations from multiple passes of a satellite.

Referring to FIG. 2a, the range from two orbiting Seasat spacecraft antennas $A_1$ and $A_2$ (spaced apart a distance B perpendicular to the flight path) to a point P (scene resolution element) on the terrestrial surface is denoted $\rho'$ for the first antenna $A_1$ and $\rho$ for the second antenna $A_2$. The phases associated with these ranges are $$\phi = 4\pi\rho/\lambda \qquad (1)$$

where $\lambda$ is the radar system wavelength.

For the present invention, these phases are taken to be the phases associated with the pixels in the two images recorded before one interferogram is formed. This is not necessarily true since phase errors can occur in processing; however, as long as identical processing is performed on all points (pixels) of the images, the same errors are introduced everywhere, and constitute only a global phase constant that will disappear in the later step of phase differencing.

In the following description of an example of the present invention, three Seasat L-band SAR images obtained of an area in the Imperial Valley of California over a period of 12 days were used to make two interferograms, and then make a double-difference interferogram which clearly showed areas of surface deformation changes. These changes were attributed to swelling of water-absorbing clays in the scene.

In correlating the three images made from that raw data, it was necessary to process the data to be sure that azimuth focusing was identical for each of the three images, or errors would have been introduced into their phases with a resulting loss of phase coherence. This was accomplished by performing a conventional focusing algorithm on the first image, thereby to compensate for the radar looking forward or back (squinting); the resulting azimuth chirp rates were then used in the other two Seasat images as well. The processing for azimuth focusing should also include coregistration, radar motion compensation, and yaw, pitch, and roll of the platform, an application of the invention may require.

In order for the two sets of phases associated with a number of pixels to be mutually coherent, there are restrictions on the distance B between antennas. Specifically, the distance B must be small enough that the speckle in the image from each pass does not change substantially; this requires both observations to be within the effective beamwidth of a reradiating resolution element. This is discussed in the paper by Gabriel and Goldstein (1988) cited above.

The Seasat L-band SAR had some orbits that met the criteria noted above for inteferometry. A full description of the Seasat radar and correlator involved may be found in F. T. Ulaby, R. K. Moore and A. K. Fung, "Microwave Remote Sensing," Addison Wesley, Reading, Mass., p. 48, 1981.

If the orbits had overlapped exactly such that B=0, only two passes would have been necessary to detect surface motion or changes in surface deformation; however, with a nonzero baseline, such changes become scrambled with the topographic information necessitating at least a third SAR image. Sequential pairs of images, such as images 1 and 2 for one pair and 2 and 3 for the second pair, are processed to form first and second single difference interferograms by multiplying the first image of a pair by the complex conjugate of the second image of the pair.

Figure 2B:
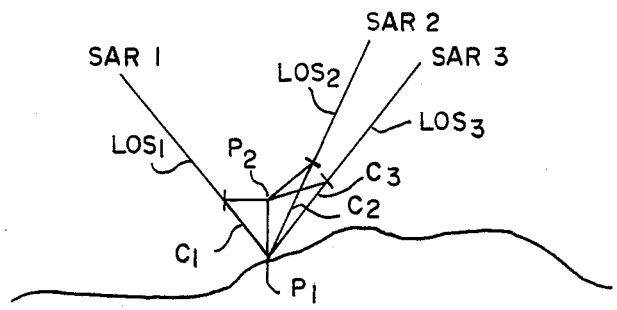
FIG. 2b illustrates the geometry for measuring surface motion using two or three SAR observations of a scene where the surface motion is not along the line of sight.

This interferometric SAR technique measures only one-dimensional changes along the line of sight. If other sets of interferograms were made along at least one other (nonparallel) direction, surface motions, including lateral motions, may be recovered in their entirety by resolving the observations into their vector components about predetermined reference axes that are mutually perpendicular with one of the three axes preferably selected to be vertical. This is illustrated in FIG. 2b which shows three different lines of sight $LOS_1$, $LOS_2$ and $LOS_3$ for interferograms used to measure one-dimensional changes in the position of a pixel from point $P_1$ to point $P_2$. By resolving the LOS components $C_1$, $C_2$ and $C_3$ of the motion in the direction of observation, total motion of the pixel to the new location $P_2$ from the original location $P_1$ can be recovered from the geometry knowing the angles involved which are measured and stored by the SAR system. Thus, two or three sets of interferograms may be used to measure surface motion. The surface motion of a pixel is shown in FIG. 2b as being vertical for ease of illustration but any lateral motion may be recovered in the same manner once the observations of the pixel are resolved into vector components.

Each of the phases from the original images is measured to the nearest multiple of $2\pi$. Thus, two targets will appear at the same phase if their ranges differ by an integral number of wavelengths. Similarly, in an interferogram, targets at different altitudes can appear at the same phase. It is necessary to find the $2\pi$ multiples of phase that disappeared or were "wrapped." The procedure is referred to hereinafter as "unwrapping" and constitutes recovering the multiples of $2\pi$ phase differences that "disappear" in the interferogram. The general approach is to view the interferograms to check for fringes and then starting at some location (seed) in the interferogram where the phases have little noise, producing fringes that are bright and clear, integrating the adjacent pixel's phase differences in expanding contours, and adding $2\pi$ to the integrated pixel phases each time they become one more multiple of $2\pi$ greater than the seed. Problems can arise where the image is noisy, or on steep slopes where the phase becomes noiselike, because there are many resolution elements at the same range. This can lead to phase ambiguities for adjacent non-noisy areas; this problem is treated in the paper by Gabriel and Goldstein (1988) cited above.

Figure 3:
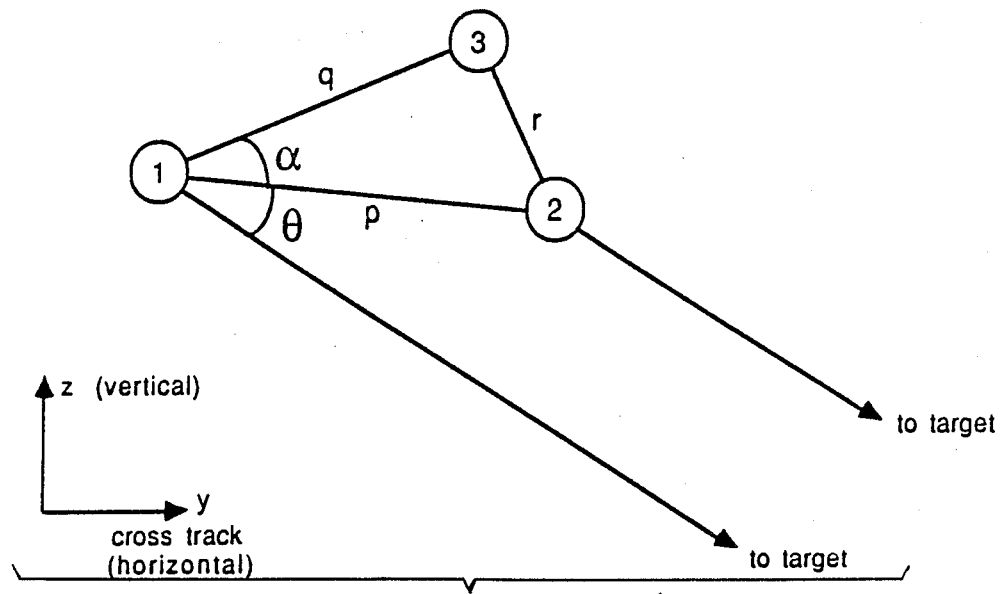
FIG. 3 illustrates the geometry of multiple observation interferometry using three observations of a scene made from three locations separated by baselines p, q and r.

FIG. 3 illustrates the geometry associated with three serial observations of a scene. The three observations are separated by baselines p, q and r. The phase associated with a given resolution element (rezel) is given by Equation (1), and the phase difference obtained from the first two observations of that rezel is $$\Delta\phi_{12} = (4\pi/\lambda)p \cos\theta \qquad (2)$$

Similarly, the first and third observations yield $$\Delta\phi_{13} = (4\pi/\lambda)q \cos(\theta + \alpha) \qquad (3)$$

Figure 4:
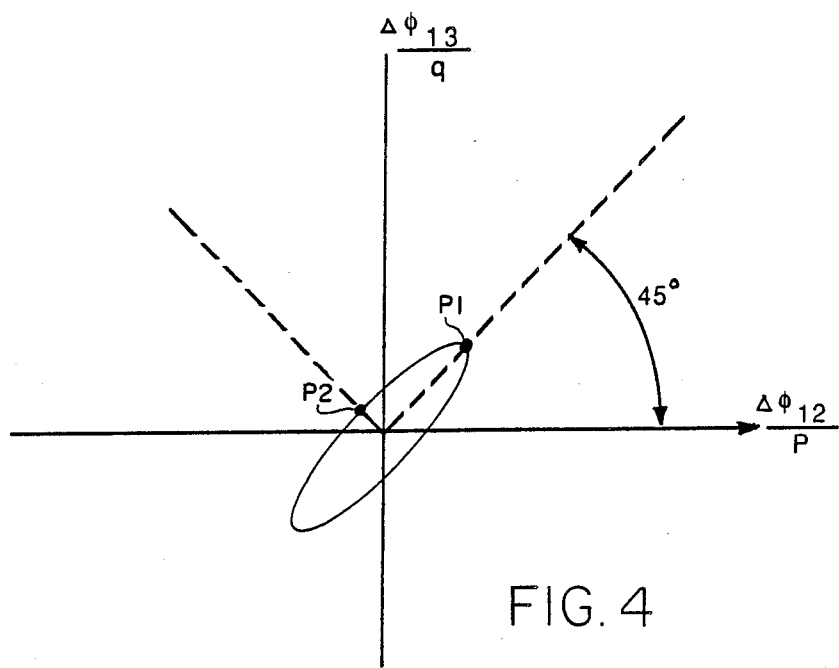
FIG. 4 illustrates an ellipse tilted at 45° as determined from $\Delta\phi_{12} = (4\pi/\lambda)$ p cos $\theta$ and $\Delta\phi_{13} = (4\pi/\lambda)$ q cos $(\theta + \alpha)$, where $\phi = 4\pi\rho/\lambda$, and $\lambda$ is the radar system wavelength. Phase measurements used for double difference interferometry are represented by the ellipse.

Note that $\Delta\phi_{12}/p$ and $\Delta\phi_{13}/q$ are the coordinates corresponding to the parametric equations of an ellipse FIG. 4. The positions of points P1 and P2 on the ellipse are defined by $\sin\alpha/(1-\cos\alpha)$ ½ and $\sin\alpha/(1+\cos\alpha)$, respectively. In the case of the Seasat data used here, $\theta$ is confined to the narrow range $21 < \theta < 23$ and $\alpha = 180$, so the ellipse almost degenerates into a straight line. If the orbits are not exactly parallel, the ellipse in FIG. 4 will be slightly different at different locations in azimuth.

The two phases $\Delta\phi_{12}$ and $\Delta\phi_{13}$ cannot be differenced directly. First, each interferogram must be "un-wrapped," as described above. Then $\Delta\phi_{12}$ and $\Delta\phi_{13}$ are plotted against each other, as in FIG. 4. Disturbances of the surface then show up as deviations of the points from the best-fit ellipse.

Where the surface has been heavily disturbed (changes smaller than a pixel) as from plowing or a landslide, the phase sets have no relationship to each other. The resulting plot shows only randomly scattered points. However, where many rezels have been affected the same way (changes larger than a pixel), such as from a residual earthquake displacement, a regular deviation from the ellipse will occur. The expression $$\phi = \Delta\phi_{12}/q - \Delta\phi_{13}/p + c \qquad (4)$$

is used to estimate the amount of phase deviation, where c is a constant, and p, q and c are taken from the best-fit ellipse for all of the data. Equation (4) highlights the aforementioned ambiguity which cannot be eliminated from only three observations. Motion of an area giving rise to changes in the phases of the associated pixels may have occured between observations 1 and 2 (thereby changing $\Delta\phi_{12}$) or may have occurred in the opposite direction between observations 1 and 3 (thereby changing $\Delta\phi_{13}$). These two possibilities have different sensitivities that depend on the two baselines. One phase change is scaled by p/q, and the other by q/p. For the present example, this change was equal to 3 cm if it occurred during the long baseline observations, and 0.3 cm if it occurred during the short baseline observations. Either a fourth observation and an obvious extension of the theory or some independent measurement will resolve this ambiguity.

The Seasat orbits in question were not exactly parallel, resulting in a very slight shearing of the images, which meant they could not be overlaid exactly. The second and third images were resampled to correct this using a procedure described in the paper by Gabriel and Goldstein (1988), cited above, and two single-difference interferograms were formed from the triplet.

The phase of each interferogram was then unwrapped and scaled by the baseline ratio as described in Equation (3), et seq., and the scaled interferogram phases were differenced by multiplying the first single-difference interferogram by the complex conjugate of said second single-difference interferogram, thereby producing a new image referred to as the 'double-difference interferogram.' The slight divergence between orbits also produced a small phase gradient across this image and was corrected by fitting a plane to the resulting phase difference map, which is the practical procedure for finding the small changes in the constants p, q, and c mentioned above. Thus, any linear phase errors in the along-track or the cross-track directions are removed. The consequence of this procedure is that only changes within a given image may be interpreted in terms of surface motion; in other words, comparing difference interferograms from two different sets of three orbits must allow for different phase gradients in each image. In the present example, the results were then interpreted according to known data about the imaging site.

The Imperial Valley is an extremely busy agricultural area having many active fields that are constantly cultivated. If a field was plowed or harvested, its surface changed and the speckle associated with the surface changed. Thus, two images of a field plowed between observations yielded noise-like phase characteristics when they were interfered as the signals were no longer coherent. Such was the case with several of the fields in the experiment; their relative phases did not correlate. The fact that the noiselike phases follow field boundaries is conclusive evidence that a physical change occurred; the effect is not from some systematic error in the experiment. Also apparent were fields with a shifted phase, which were the objects of interest, and large areas with no phase change, as would be expected.

The site for the experiment was originally chosen because there were two small earthquakes (Richter 2.5) that occurred between the observations with epicenters near a radio tower. It may be safely concluded that any residual seismic displacements were less than the 1 cm accuracy of this technique. In the broader scene, there were clearly significant phase changes (90° phase shifts). Some physical change on the ground caused the phase to change in a coherent manner across entire fields. After some investigation, the most likely explanation was that those fields were watered between the observations. While the dielectric properties of the soil change with the addition of water, the Fresnel reflection coefficient does not change enough to allow the large (90°) phase shifts seen unless there is penetration and subsurface scattering, in which case the large dielectric constant of water might cause a propagation delay through the wet soil. However, numerical estimates do not support this view. A better explanation is that the soils in the area are composed of hydroscopic clays that expand when wet. The phase changes observed probably resulted from expansion of an entire field when it was watered or contraction when it dried out. While such motions would not be large, the sensitivity of the method is so high that it could be visible.

Each field served by the Imperial Valley Water District has one or more gates that allow irrigation water from one of the surrounding canals. It was possible to collect some ground truth, consisting of ten year old watering records from the area. Records exist for approximately 85% of the fields that exhibited a significant phase change. In addition, at each such site, records were sought for at least two nearby fields that had no phase change.

Figure 5:
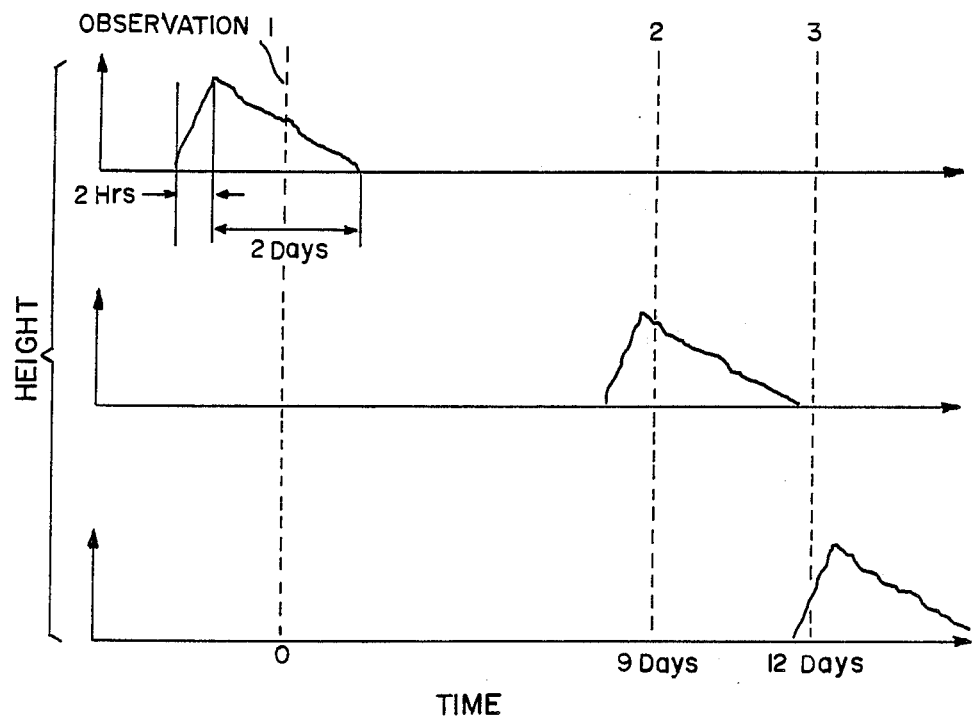
FIG. 5 illustrates graphs used for interpretation of height changes of a site in the Imperial Valley of California. Watering is assumed to make the ground swell quickly over several hours followed by a slow shrinkage over several days.

The watering records were interpreted using the model presented in FIG. 5, which shows the motion of the surface resulting from watering and indicates schematically the changes in propagation path associated with the motion. The water was assumed to be absorbed (causing swelling) over a period of a few hours and to evaporate (causing shrinkage) over a few days. Based on the watering records, which gave the date and amount of water supplied to each field, estimates of the amount of moisture present were made for each of 52 sites in the image. Then Equation (4) was used to estimate the expected phase change, which was classified into seven categories from strongly negative through zero to strongly positive. Each of the 52 sites was similarly assigned to one of seven categories of phase changes, from negative to zero to positive. The two lists were then compared. In 48 cases, there was agreement between the theory and the experiment; in two cases, the result was ambiguous because the phase change was too noise for clear classification. In the final two cases, the phase change disagreed with what was predicted which was attributed to a clerical error in looking up the watering records.

We claim:

1. A method for detecting surface motions or mapping small terrestrial or planetary surface deformation changes over large areas using synthetic aperture radar comprising the steps of
    making two synthetic aperture radar images sequential in time, but of the same area with flight paths substantially duplicated,
    processing said synthetic aperture radar images for azimuth focusing, co-registration, motion compensation, and yaw, pitch and roll, of the platform
    forming a difference interferogram of said area from said two synthetic aperture radar images, after processing in the previous step,
    unwrapping phases of pixels of said difference interferogram by finding the $2\pi$ multiples of phase, if any, that disappear in the making of said difference interferogram, and
    observing line of sight surface motion or deformation changes in said terrestrial or planetary surface from said unwrapped difference interferogram, where said line of sight is of said synthetic aperture radar while making said images.

2. A method as defined in claim 1 including the step of making at least one additional set of two or more sequential synthetic aperture radar images of the same area, but with flight paths producing different lines of sight for said synthetic aperture radar, recovering the line of sight component of said line of sight surface motion or deformation changes from each set of radar images, and from said line of sight components recovering total surface motion, including lateral surface motion or surface deformation changes by resolving said line of sight components into vertical and lateral vector components.

3. A method for mapping small terrestrial or planetary surface deformation changes over large areas with synthetic aperture radar comprising the steps of
    making three sequential synthetic aperture radar images of the same scene with phase coherence between corresponding pixels of said images, at least one of which is made significantly later than the other two
    processing said synthetic aperture radar images for azimuth focusing, co-registration, motion compensation, and yaw, pitch and roll, of the platform
    forming a first single-difference interferogram from a first pair of synthetic aperture images after processing in the second step, said first pair being selected from said three sequential synthetic radar images,
    forming a second single-difference interferogram from a second pair of synthetic aperture images after processing in the second step, said second pair being distinct from said first pair selected from said three sequential synthetic aperture radar images,
    unwrapping phases of pixels of said first and second single-difference interferograms by finding the $2\pi$ multiples of phase that disappear in the making of said first and second single-difference interferograms,
    forming a double-difference interferogram from said first single-difference interferogram and said second single-difference interferogram, thereby removing phase changes from corresponding pixels due to topography, leaving an image of nonzero phases only in areas where surface deformation has changed in the time between said first pair of images and said second pair of images, and observing surface deformations in said terrestrial or planetary surface from said double-difference interferogram.

4. A method as defined in claim 3 wherein the step of forming said double-difference interferogram includes scaling fringes of said first and second single-difference interferograms by the ratio of baselines of the observations used for making said three sequential synthetic aperture radar images for said first and second single-difference interferogram.

5. A method as defined in claim 1 wherein said step of processing synthetic aperture radar images for azimuth focus includes resampling images until they overlay.

6. A method as defined in claim 5 wherein said step of processing synthetic aperture radar images includes removing phase gradients caused by path divergence of said synthetic aperture radar during said observations used for making said sequential synthetic aperture radar images.

7. A method as defined in claim 3 including the step of making at least one additional set of two or more sequential synthetic aperture radar images of the same area, but with flight paths producing different lines of sight for said synthetic aperture radar, recovering the line of sight component of said line of sight surface motion or deformation changes from each set of synthetic aperture radar images, and from said line of sight components recovering total surface motion, including lateral surface motion or surface deformation changes by resolving said line of sight components into vertical and lateral vector components.

8. A method for mapping small terrestrial or planetary surface deformations over large areas using synthetic aperture radar comprising the steps of making multiple sequential synthetic aperture radar images of the same scene with phase coherence between corresponding pixels, processing said synthetic aperture radar images for azimuth focusing, forming a first single-difference interferogram from a first image of a first pair and a second image of said first pair, said first pair of images being selected from sequential ones of said multiple sequential synthetic radar images, forming a second single-difference interferogram from a first synthetic aperture radar image of a second pair and a second synthetic aperture radar image of said second pair, said second pair of synthetic aperture radar images being selected from sequential ones of said multiple sequential synthetic radar images, where each of said first and second synthetic aperture radar images of said second pair of synthetic aperture radar images is distinct from said first pair of synthetic aperture radar images, and at least one synthetic aperture radar image of said second pair is significantly later in sequence than both synthetic aperture radar images of said first pair, unwrapping phases of each pixel of said first and second single-difference interferograms by finding the $2\pi$ multiples of phase that disappear in the making of said first and second single-difference interferograms, forming a double-difference interferogram from said first single-difference interferogram and said second single-difference interferogram, thereby removing phase changes between corresponding pixels due to topography, leaving an image of non-zero phases only in areas where surface deformation has changed in the time between said first pair of synthetic aperture radar images and said later observation, and observing surface deformation changes in said terrestrial or planetary surface from said double-difference interferogram.

9. A method as defined in claim 8 wherein the step of forming said double-difference interferogram includes scaling fringes of said first and second single-difference interferograms by the ratio of baselines of the observations used for making said sequential synthetic aperture radar images for said first and second single-difference interferograms.

10. A method as defined in claim 9 wherein said step of processing synthetic aperture radar images for azimuth focus includes resampling synthetic aperture radar images until they overlay.

11. A method as defined in claim 10 wherein said step of processing synthetic aperture radar images includes removing phase gradients caused by path divergence of said synthetic aperture radar during said observations used for making said sequential synthetic aperture radar images.

12. A method as defined in claim 11 wherein the step of forming said multiple interferograms includes scaling fringes of said later interferograms by the ratio of baselines of the observations used for making said sequential synthetic aperture radar images for said later interferograms.

13. A method as defined in claim 8 including the step of making at least one additional set of two or more sequential synthetic aperture radar images of the same area, but with flight paths producing different lines of sight for said synthetic aperture radar, recovering the line of sight component of said line of sight surface motion or deformation changes from each set of synthetic aperture radar images, and from said line of sight components recovering total surface motion, including lateral surface motion or surface deformation changes by resolving said line of sight components into vertical and lateral vector components.

* * * * *